Patented Jan. 17, 1928.

1,656,483

UNITED STATES PATENT OFFICE.

WILHELM HERZBERG, OF BERLIN-WILMERSDORF, AND GERHARD HOPPE, OF BERLIN-TREPTOW, GERMANY, ASSIGNORS, BY MESNE ASSIGNMENTS, TO GRASSELLI DYESTUFF CORPORATION, OF NEW YORK, N. Y., A CORPORATION OF DELAWARE.

MANUFACTURE OF COERULEINE SULPHONIC ACIDS.

No Drawing. Application filed April 20, 1926, Serial No. 103,358, and in Germany May 7, 1925.

The coeruleine which can be obtained by heating pyrogallolphthaleine with concentrated sulphuric acid is more easily applied in dyeing when converted into its bisulphite compound which is soluble in water. The analogous coeruleine (Berichte der Deutschen Chemischen Gesellschaft 34, page 2301), which is obtained from hydroxyhydroquinonephthaleine, on the other hand forms no bisulphite compounds soluble in water.

The hydroxyhydroquinone, of which the hydroxyhydroquinone-phthaleine referred to is a derivative, has the formula:

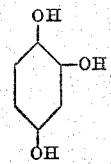

By this invention the coeruleines can be converted into sulphonic acids which are easily soluble in water by treating them with fuming sulphuric acid in the presence of boric acid. These sulphonic acids yield fast dyeings with the usual metal mordants.

The following example illustrates the invention, the parts being by weight:

4 parts of coeruleine having probably the formula:

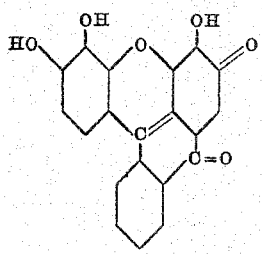

are introduced into a solution of 3 parts of crystallized boric acid in 30 parts of fuming sulphuric acid containing 60 per cent of $SO_3$ and the whole is heated for 2 hours at 130° to 140° C. The mixture is poured on to ice and from the solution the coeruleine sulphonic acid is separated by salting out. It is a black powder which dissolves easily in water to a blue-black solution. It yields green tints on fibers mordanted with a metal.

It is obvious to those skilled in the art that our present invention is not limited to the foregoing example or to the details given therein. It may be stated for instance that there may be substituted for the coeruleine the isomeride having probably the formula:

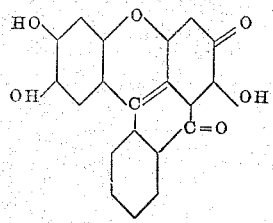

obtainable from hydroxyhydroquinonephthaleine in which case there is obtained a sulphonic acid soluble in water to a dirty violet solution which yields with metal mordants blue to blue-black tints. In using such other coeruleine the proportions of the ingredients as well as the other special conditions of reaction may be altered in order to obtain the best results.

It cannot be stated with certainty what position the sulphonic acid group occupies in the coeruleine sulphonic acids which are obtainable by the herein-described treatment.

What we claim is,—

1. Coeruleine sulphonic acids which are easily soluble in water yielding dark blueish to violet solutions, which dye with metal mordants green to blue to blue-black tints, and which are obtainable by heating a coeruleine with fuming sulphuric acid in the presence of boric acid.

2. The coeruleine sulphonic acid, which is easily soluble in water yielding a blue-black solution, which dyes with metal mordants green tints, and which is obtainable by heating the coeruleine obtained by heating pyrogallolphthaleine with concentrated sulphuric acid, with fuming sulphuric acid in the presence of boric acid.

In testimony whereof we affix our signatures.

WILHELM HERZBERG.
GERHARD HOPPE.